United States Patent [19]

Langermann

[11] 4,188,155
[45] Feb. 12, 1980

[54] CONTAINMENT BOOM

[76] Inventor: P. Hillel Langermann, 86 Greenough St., Brookline, Mass. 02146

[21] Appl. No.: 931,965

[22] Filed: Aug. 8, 1978

[51] Int. Cl.$^2$ ............................................. E02B 15/04
[52] U.S. Cl. ........................................................ 405/63
[58] Field of Search ................................ 405/63–72, 405/21, 23, 26, 27; 210/DIG. 25, DIG. 26

[56] References Cited
U.S. PATENT DOCUMENTS

| | | | |
|---|---|---|---|
| 3,592,008 | 7/1971 | Trindle | 405/72 X |
| 3,718,001 | 2/1973 | Harper | 405/63 |
| 3,751,925 | 8/1973 | Thurman | 405/63 X |
| 3,757,526 | 9/1973 | Larsson | 405/70 |
| 3,779,020 | 12/1973 | Muramatsu et al. | 405/64 |
| 3,811,285 | 5/1974 | Ballu | 405/72 X |
| 3,859,796 | 1/1975 | Benson | 405/64 |
| 4,062,191 | 12/1977 | Preus | 405/72 |

FOREIGN PATENT DOCUMENTS 7408400  6/1974  Netherlands ............................... 405/72

Primary Examiner—Dennis L. Taylor

[57] ABSTRACT

A boom for the containment of oil spills and other debris on the surface of a body of water is formed of a curtain disposed at the surface of the water in a generally vertical plane with a lower edge of the curtain being submerged below the surface. Floatation for the curtain is provided by a set of floats secured within pockets of a flexible material which is sewn to the curtain. Stiffening members in the form of rods are secured transversely to the curtain at regular intervals between the floats. Weights are positioned at the lower ends of the rods to maintain the vertical attitude of the curtain. Ports at the bottom of each pocket admit water to the interior of the pockets while air escapes through the stitching. Water entrapped within the pockets greatly increases the virtual mass of the boom for resisting sudden lurches and rolling movements induced by waves of water striking the boom. After using the boom, the water is permitted to drain out of the pockets via the ports to provide a light weight, portable boom that is readily stowed.

11 Claims, 6 Drawing Figures

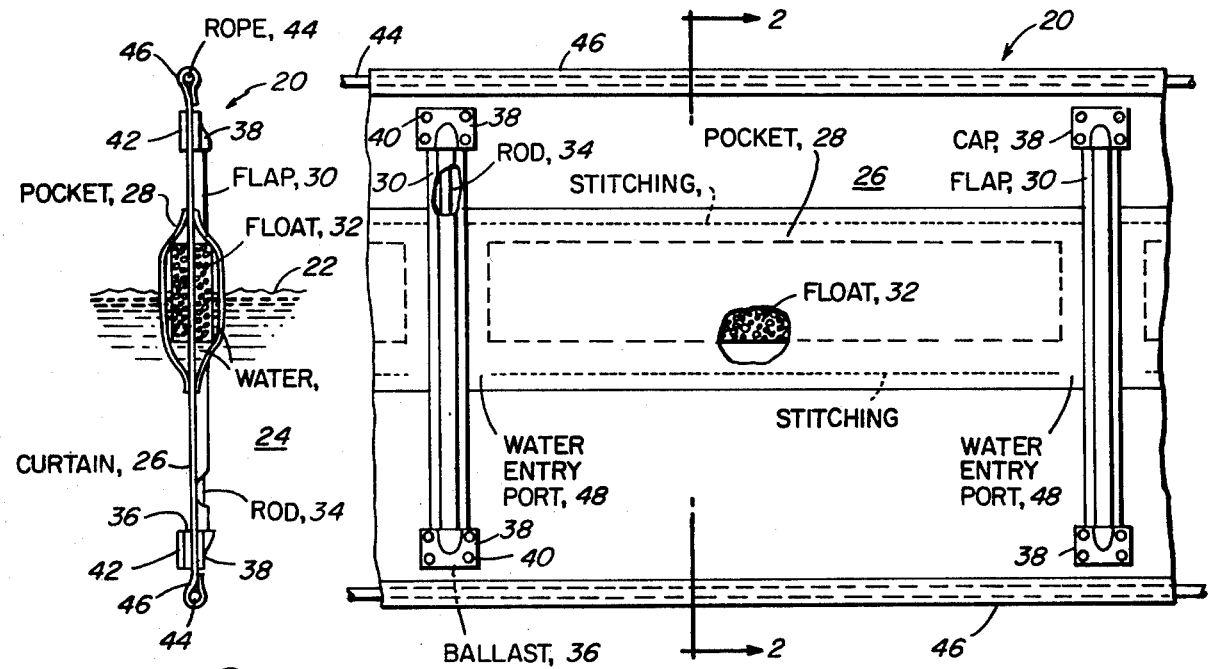
FIG. 2
FIG. 1
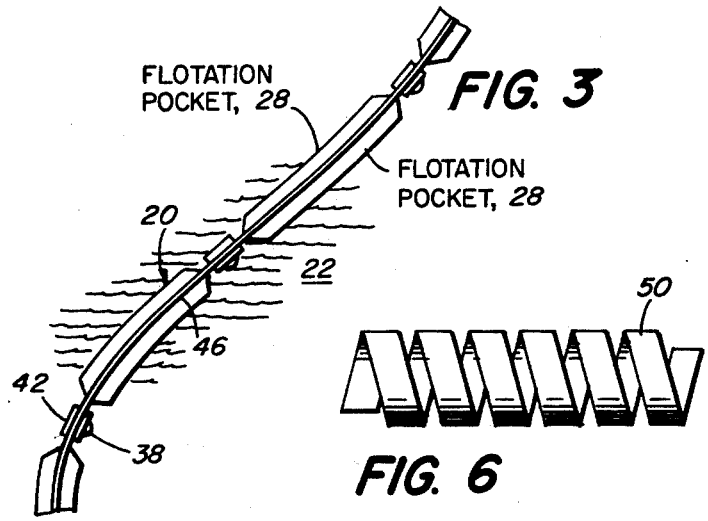
FIG. 3
FIG. 6
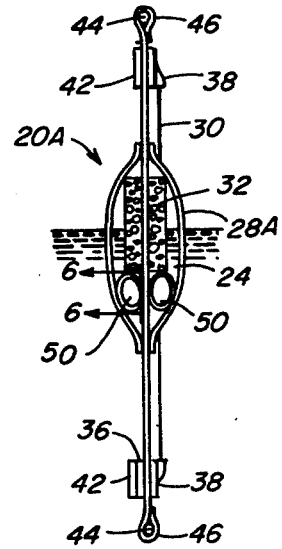
FIG. 5
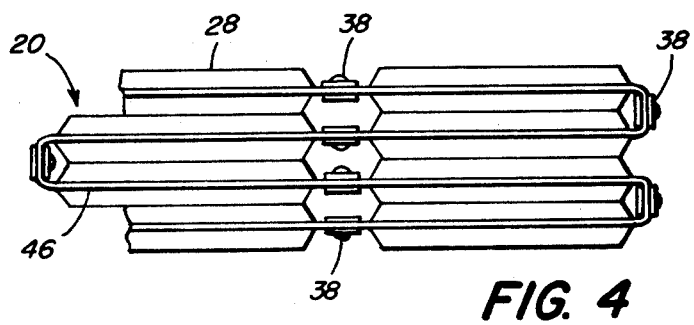
FIG. 4

CONTAINMENT BOOM

BACKGROUND OF THE INVENTION

Containment booms are utilized for the removal of oil, debris, and other pollutants floating on the surface of a body of water, particularly harbors which are susceptible to oil spills from ships. The booms float on the surface of the water and form a wall around the floating material, such as an oil slick, to contain the floating material as it is removed from the water surface.

A problem arises in that the booms are often deployed in water having waves which can upset the boom and permit the oil of the oil slick to wash over the boom. For example, during heavy seas the crest of a wave can strike a boom causing it to roll over so that the wave with the oil thereon pass over the boom.

Attempts have been made to stabilize booms to overcome the foregoing problem by the use of outriggers and similar floating structures which are attached to the curtain of the boom to maintain the vertical attitude of the curtain in the presence of heavy seas. One such structure is shown in the U.S. Pat. No. 3,695,042 which issued in the name of C. S. Denison on Oct. 3, 1972. Such structures have the disadvantage of adding substantial size, weight, and complexity to the boom. Such a disadvantage can well be appreciated when a lengthy section of boom is to be deployed and only a small boat is available for the deployment.

SUMMARY OF THE INVENTION

The foregoing problem is overcome and other advantages are provided by a containment boom which, in accordance with the invention, is stabilized by pockets which entrap water alongside the curtain of the boom and thereby greatly increase the apparent mass of the boom as seen by a wave striking the boom. The pockets have ports which remain open to the water so that there is no net change in the weight of the boom. However, the ports are sufficiently small so that the water is effectively entrapped within the pockets to produce a relatively large virtual mass under the dynamic conditions of wave motion. The large virtual mass of the curtain resists the forces of an impinging wave to prevent a rolling of the boom and to dampen movements of the boom, thereby stabilizing the boom during heavy seas. When the boom is removed from the water, the water drains out from the ports leaving the boom lightweight and flexible so that the boom may be readily stowed, transported, and deployed.

In a preferred embodiment of the invention, the curtain and pockets of the boom are formed of a vinyl coated nylon canvas. The pockets are sewn on the curtain for containing floatation in the form of flat rectangular floats of closed cell foamed polyethylene. The lower corners of the pockets are open to form ports for the entry and egress of water from the body of water in which the boom is deployed. The sewn edges of a pocket permit the escape of air between the stitches of the sewn edges as the water enters the ports at the bottom of the pocket and drives out the air contained within the pocket.

Stiffening rods are positioned at regular intervals along the curtain, the rods being affixed transversely to the curtain between the pockets by flaps of canvas sewn to the curtain. The ends of the rods are protected by rigid vinyl caps riveted through the curtain. Ballast in the form of vinyl covered lead weights are secured to the curtain at the bases of the stiffening rods to orient the rods and the curtain in a vertical attitude as the boom is supported at the surface of the body of water by the floatation. The lower portion of the curtain is submerged approximately two-thirds of its height in the water with the curtain freeboard above the water surface being equal approximately to one-third of the curtain height.

BRIEF DESCRIPTION OF THE DRAWINGS

The aforementioned aspects and other features of the invention are explained in the following description taken in connection with the accompanying drawings wherein:

FIG. 1 is an elevation view of a portion of the boom of the invention showing the ports in the floatation pockets for the entry and egress of water, portions of the figure being cut away to expose a float and a stiffening rod;

FIG. 2 is a sectional view of the boom of FIG. 1 taken along the line 2—2 of FIG. 1;

FIG. 3 is a stylized plan view of the boom of FIG. 1 deployed in a body of water;

FIG. 4 is a stylized view of the boom of FIG. 1 folded in a compact form for stowage;

FIG. 5 is a transverse sectional view of an alternative embodiment of the boom of the invention showing an enlarged pocket containing a spacer in the form of a coil; and FIG. 6 is an elevation view of the spacer of FIG. 5 taken along the lines 6—6.

DETAILED DESCRIPTION

Referring now to FIGS. 1-4, a boom 20 is constructed in accordance with the invention and is seen to be floating on the surface 22 of a body of water 24 in FIGS. 1-3. The boom 20 comprises a curtain 26 having pockets 28 and flaps 30 sewn to the curtain 26 for containing, respectively, floats 32 and rods 34. The rods 34 are positioned on the front side of the curtain 26 while the pockets 28 are positioned on both the front and the back sides of the curtain 26. The floats 32 support the curtain 26 at the surface 22. The curtain 26 is maintained in a vertical attitude by ballast 36 spaced periodically along the bottom of the curtain 26. Caps 38 are riveted through the curtain 26 at the tops and bottoms of the flaps 30 to secure the ends of the rods 34. The riveting of the caps 38 is accomplished by rivets 40 secured to plates 42 on the back side of the curtain 26. In the preferred embodiment of the invention, the curtain 26 is formed of vinyl coated nylon fabric having a weight of 22 ounces per square yard. While the curtain 26 may be fabricated in a variety of sizes, one exemplary boom 20 has a freeboard of six inches and a draft of 12 inches for a total height of 18 inches.

The ballast 36 is formed of vinyl covered lead weights secured between the plates 42 and the caps 38 at the bottom of the curtain 26. The floats 32 have a flat rectangular shape and are formed of a closed cell, foamed material such as internally expanded polyethylene. An exemplary float 32 has a length of 22 inches, a width of 5 inches and a depth of approximately one-half inch. The caps 38 are of a rigid vinyl material which prevents the rods 34 from protruding through the curtain 26 during deflection thereof by heavy seas. A water inpervious rope 44 such as a polypropelene rope is inserted in hems 46 at the top and the bottom of the curtain 26 to serve as a tension line for strengthening the boom 20, the rope 44 having an exemplary diameter of one-quarter inch. The rods 34 are of a rigid reinforced plastic material such as styrene or polycarbonate resin reinforced with fiber-glass. The weight of a boom 20 having the aforementioned 18 inch height is 1.25 pounds per linear foot. The rods 34 stiffen the curtain 26 for holding the curtain 26 upright in the water 24 as the ballast 36 urges the curtain 26 to a vertical attitude about the floats 32 which serve as a fulcrum about which the curtain 26 pivots to its upright position for containing material floating on the surface 22.

In accordance with the invention, ports 48 are provided in the bottom corners of the pockets 28. As the boom 20 is being deployed, water enters via the ports 48 into the pockets 28 while air escapes via the stitches at the edges of the pockets 28 to make room for the water. Upon removal of the boom 20 from the body of water 24, the water drains out from the pockets 28 via the ports 48 to permit the boom 20 to be folded into a compact configuration as is shown in FIG. 4. During the sewing of the pockets 28, as is seen in FIGS. 1-2, the fabric is draped over the floats 32, but without being drawn taut, so that space is thereby created between the fabric and the float for the entrapment of water. The water is believed to rise within a pocket 28 to the same level or approximately the same level as that of the surface 22 since no significant changes in the draft and freeboard have been observed as a pocket 28 fills with water. In the preferred embodiment, the ports 48 have been conveniently formed by the absence of stitching at the bottom corners of a pocket 28 as is seen in FIG. 1. The width of a port 48 is approximately three-quarters inch as measured along the line of the stitching.

Assuming by way of example that the volume of the entrapped water is approximately equal to the volume of the floatation, then the weight of the foregoing boom including the weight of the entrapped water is two to three times greater than that of the boom prior to the entry of the water. Because of the relatively small size of the port 48 as compared with the length of the pocket 28, approximately 24 inches, the time required for the water to enter or to leave the pocket 28 is much longer than the duration of an impact of a wave crest upon the boom 20 so that the volume of the entrapped water remains essentially constant during the impact of a wave. Thus, under the dynamic forces of wave motion, the effective or virtual mass of the boom 20 including the mass of the water is more than double that of the boom 20 itself with the resultant increased resistance to the water motion and greatly enhanced stability. The attitude of the boom 20 remains substantially vertical in the presence of both wind and wave motion so that floating debris such as an oil slick cannot wash over the top of the boom 20, but remains contained by the boom 20.

Referring now to FIGS. 5-6, an alternative embodiment of the boom of the invention, identified by the legend 20A, includes enlarged pockets 28A having spacers 50 positioned therein beneath the floats 32 for entrapping a still greater amount of water. The spacer 50 has the shape of a coil, or spring, for retaining the float 32 in the upper portion of the pocket 28A to facilitate admission of a larger quantity of water into the pocket 28A. The spacer 50 may be formed of a soft vinyl plastic material or of a vinyl covered wire spring. The spacer 50 permits a trebling or greater increase in the virtual mass of the boom 20A upon its deployment.

While stitching has been employed in the preferred embodiment of the invention for securing the pockets 28 to the curtain 26, other forms of fastening may be employed if desired. For example, the pockets may be riveted to the curtain, or heat sealed to the curtain by applying heat and pressure to the vinyl coating of the canvas along the seams of the pocket. In either case, openings must be left at the bottom edge of a pocket 28 to serve as the ports 48. In addition, openings must be provided along the upper edge of a pocket 28 to permit the escape of entrapped air as do the spaces between the stitches of the preferred embodiment.

Returning to FIG. 2, it is seen that the water entapped within the pockets 28 is located alongside the floats 32 and is therefore in proximity to the center of buoyancy of the boom 20, since the major contribution to the buoyancy is provided by the floats 32. Thereby, the resistance of the entrapped water to the waves appears to act generally at the center of the hydrodynamic forces of the waves for improved stability. The spacing between the ballast 36 and the center of mass of the entrapped water provides inertia for resisting a rolling of the boom 20 about a longitudinal axis thereof under the hydrodynamic forces of the body water 24, and thereby stabilizes the boom 20.

It is understood that the above described embodiments of the invention are illustrative only and that modifications thereof may occur to those skilled in the art. Accordingly, it is desired that this invention is not to be limited to the embodiments disclosed herein, but is to be limited only as defined by the appended claims.

What is claimed is:

1. A boom for the containment of material floating on the surface of a liquid comprising:
    a curtain having a pocket attached thereto;
    means for floating said curtain on said surface;
    said pocket having a port permitting a quantity of said liquid to flow into said pocket in response to hydrostatic forces of said liquid in which said boom is to be floated, the size of said port being much smaller than the size of said pocket to provide an egress time of said quantity of said liquid which is much longer than the duration of an impact of a wave of said liquid upon said boom, said quantity of liquid being essentially entrapped in said pocket under the dynamic conditions of motion of said liquid thereby increasing the effective mass of said boom for resisting said liquid motion.

2. A boom according to claim 1 wherein said curtain is formed of a flexible material, and said pocket is formed of a flexible material to permit a flexing of a wall of said pocket in response to movement of said liquid, the material of said pocket being secured to the material of said curtain at a plurality of spaced apart locations defining passages therebetween, air contained within said pocket being driven out via said passages between said locations in response to said hydrostatic forces upon entry of said quantity of liquid into said pocket.

3. A boom according to claim 2 wherein said liquid is water, and said material is a fabric of vinyl coated nylon.

4. A boom according to claim 2 further comprising stiffening rods placed alongside said pocket, said floating means comprising floatation contained within said pocket and ballast placed at the bottom of said curtain at spaced apart positions at the ends of said rods for urging said boom to a vertical attitude.

5. A containment boom comprising:

floatation;

a curtain supported by said floatation on the surface of a liquid; and means connected to said curtain for entrapping a quantity of said liquid, the mass of the entrapped liquid increasing the stability of said boom, a buoyant force of said floatation being essentially independent of said entrapped liquid, said entrapping means having openings for the passage of fluid, all of said openings being sufficiently small to ensure an egress time of said quantity of liquid which is much longer than the duration of an impact of a wave of said liquid upon said boom.

6. A boom according to claim 5 wherein said entrapping means permits the egress of said quantity of liquid upon separation of said boom from said liquid.

7. A boom according to claim 6 wherein said entrapping means comprises a series of pocket means, said curtain being foldable between successive ones of said pocket means for stowage of said boom.

8. A boom according to claim 5 further comprising means including ballast for rotating said boom about said floatation to a vertical attitude, said rotating means including stiffening means spaced apart along said curtain and in contact therewith, said ballast comprising elements of ballast spaced apart along said boom and secured to respective ones of said stiffening means.

9. A containment boom comprising:

a curtain having a pocket attached thereto;

floatation for supporting said curtain on the surface of a liquid;

said pocket having a port for the entry of a quantity of said liquid upon which said boom is to be floated;

said curtain being formed of a flexible fabric, and said pocket being formed of a flexible fabric secured on all edges of said pocket to said curtain for entrapping said quantity of liquid, a buoyant force of said floatation being essentially independent of said entrapped liquid.

10. A boom according to claim 9 wherein said securing of said pocket fabric to said curtain is provided by stitches in sewn edges of said pocket, said stitches being sufficiently close together for entrapping said liquid while permitting the escape of air driven out of said pocket between said stitches by the entry of said liquid into said pocket.

11. A boom according to claim 10 wherein the size of said port is sufficiently small relative to the size of said pocket to provide an egress time of said quantity of liquid which is much longer than the duration of an impact of a wave of said liquid upon said boom, said entrapped liquid increasing the effective mass of said boom for resisting movement of said liquid to stabilize said boom.

* * * * *